July 10, 1962 C. J. LOECHL 3,043,014
DRYING OF GYPSUM BOARD
Filed May 31, 1957
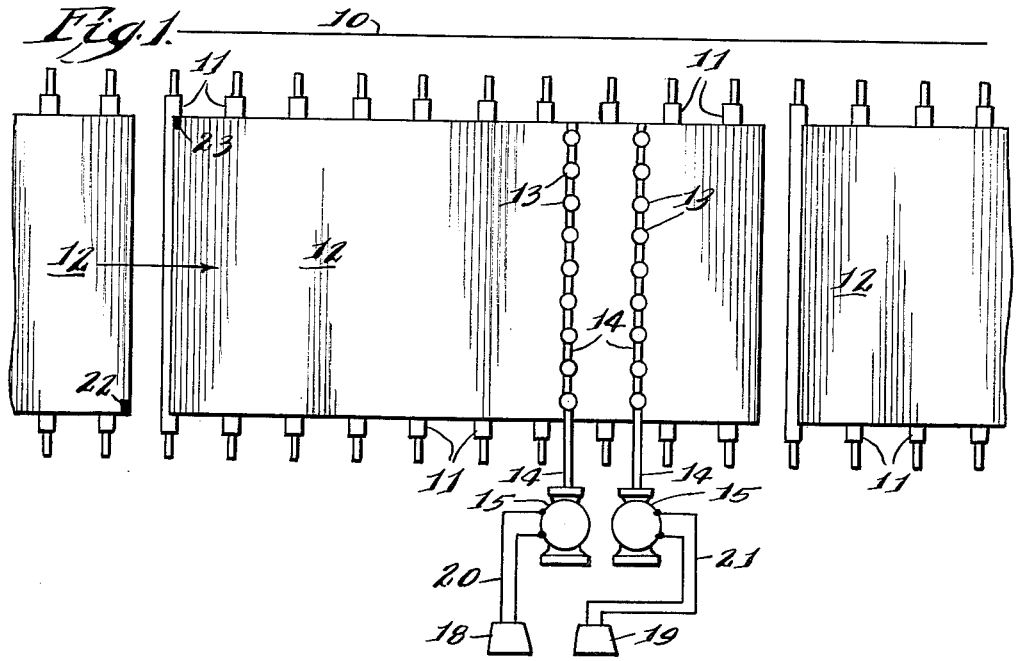
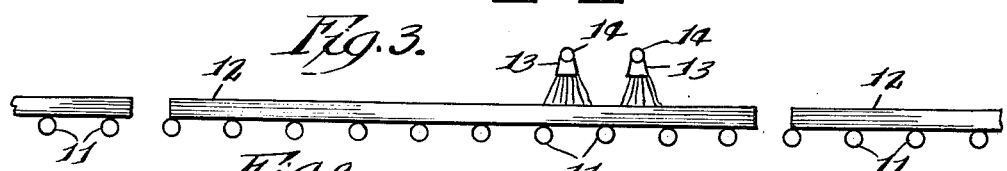
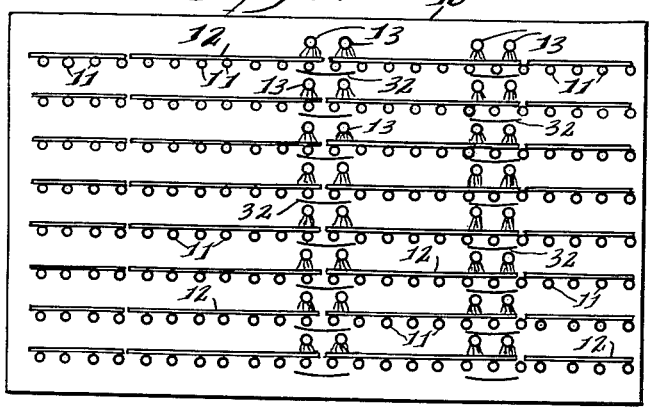
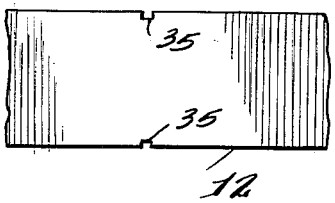
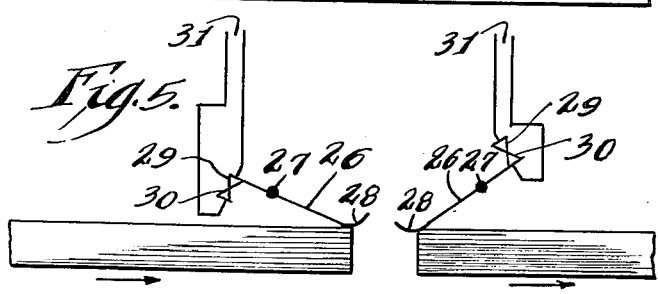
Inventor.
Clarence J. Loechl.
By. Edw. A. Hampson
Attorney.

United States Patent Office 3,043,014
Patented July 10, 1962

3,043,014
DRYING OF GYPSUM BOARD
Clarence J. Loechl, Arlington Heights, Ill., assignor to The Celotex Corporation, Chicago, Ill., a corporation of Delaware
Filed May 31, 1957, Ser. No. 662,668
2 Claims. (Cl. 34—43)

This invention relates to apparatus and procedure for protecting the end edges of gypsum wallboard in its process of manufacture.

Gypsum wallboard comprises a set gypsum core having adhered paper facings. The gypsum core consists almost entirely of set gypsum, which is calcium sulfate, with two molecules of combined water and which corresponds to the composition of the raw gypsum rock.

In preparing the raw gypsum rock for the manufacture of gypsum wallboard, it is subjected to heating or a process normally referred to as "calcination," wherein the heat applied drives off one and one-half molecules of the combined water to form what is usually referred to as "gypsum stucco," which is calcium sulfate with one-half molecule of combined water. When the gypsum stucco is mixed with water a slurry is formed which is cast or formed as a core sheet between paper facings to constitute the gypsum wallboard of commerce. This core, in setting, reabsorbs one and one-half molecules of water to reconstitute the gypsum of the core as calcium sulfate with two molecules of combined water.

In the process of the manufacture of gypsum wallboard the board, after it is formed and the gypsum core has set, is subjected to drying in a drying kiln so as to rapidly drive off the excess water which was mixed with the stucco to form the slurry of such consistency that it might be cast between the paper facing sheets.

In order that commercial production rates may be attained, these drying kilns are operated at relatively high temperature, usually at a temperature which decreases from about 500° at the entrance end to about 250° at the exit end. The formed and set gypsum board is ordinarily cut to its finished length of eight, ten or twelve feet or thereabouts before it is fed into the drying kiln. In the drying kiln the ends of the individual sheets are subjected to more severe drying than is the body of the sheet since drying occurs not only from the surface faces adjacent the end edges, but drying also occurs from the face of the end of the sheet. Due to the fact that the sheet dries more rapidly at its ends, the ends normally dry before the body of the sheet is fully dried, whereupon, due to the temperature within the kiln, these dried end portions are often recalcined, at least to some degree, that is, at least some part of the combined water is driven off. This condition of partial or in some cases almost complete recalcination of the end edge portions of the sheets results in the production of more or less defective sheets of gypsum wallboard, or requires that the sheets as fed into the drier shall have been cut over-size as to length whereby, through an additional operation, after drying, the sheets may be end-trimmed to remove the defective end portions.

The inventions hereof are directed to a process and apparatus whereby conditions are created which prevent the re-calcination of the end edges of the boards during the drying procedure in the production of gypsum wallboard.

Very briefly, the inventions hereof deal with suitable steps and apparatus for applying at the end edges a coolant and/or provide what will be referred to as a "sealant" which retards the rate of evaporation of water from the end portions of the board to the extent that the end edge portions dry at the same rate as the body portion of a board and thus the end edge portions, not being dried prior to the drying of the main body portion, the condition will not exist which results in recalcination of the end edge portions of the boards during drying.

The principal object of the inventions hereof is the provision of a suitable process and apparatus for equalizing the rate of drying throughout the entire gypsum wallboard sheet being dried. A further objective is to provide an apparatus for applying a coolant at and adjacent the end edge portion of a gypsum wallboard sheet during its process of manufacture either prior to or subsequent to the entry of such sheet into a drier. Other and further objectives of the invention will be apparent upon reading the following specification considered in connection with the accompanying drawings.

In the accompanying drawings the apparatus is schematically illustrated in FIGURE 1, which is a plan view taken on a conveyer level in a gypsum wallboard drier;

FIGURE 2 is illustrative of a longitudinal section taken through a drier; and

FIGURES 3, 4 and 5 are fragmentary illustrations of details.

Those to whom this description is addressed will understand that this invention applies to the usual present commercial processes of the manufacture of gypsum wallboard. Very briefly, this process is that of mixing calcined gypsum together with the usual additives and water to form a slurry which is deposited on the face cover sheet of the board and over which there is placed the back cover sheet, the edges of the face cover sheet having been folded in to form the edges of the wallboard with the back cover sheet overlying these inturned edges and adhered thereto to comprise a fully enclosed wallboard sheet which is continuously so formed. The formed sheet proceeds forward on what is usually termed a "seating" belt for a period sufficient for the gypsum of the core to set and then the continuously formed board is cut to suitable lengths, sometimes as individual boards and sometimes as a multiple of commercial length boards. These cut sections are then passed into a drier where the excess water is driven off. In some cases the boards pass into the drier with the face sheet down, although now the more general practice is to turn the boards over before they go into the drier so that their faces are up.

This invention is applicable in either case, that is, it does not depend on whether the boards pass through the drier with their face sheets up or down, but it is to be understood, and it will be apparent, that in an operation where the boards pass through a drier face up the sprays, which will be described, are to be positioned below the board to spray upwardly, whereas if the boards pass through the drier with their faces down, the sprays will be positioned above the board to spray downwardly.

For accomplishing the objectives of the inventions hereof, provision is made for spraying the ends of the boards as they pass through the drier. This refers to the ends of the individual lengths in which the board passes through the drier, because it is only necessary to retard or offset evaporation at the ends of a sheet of board where the core is exposed and which results in fast drying due to the fact that not only is there evaporation from the surfaces at the ends, but there is also evaporation from the exposed end edge portion of the sheet.

It will be understood that the conventional gypsum board drier consists essentially of a suitable casing or housing in which there are arranged usually eight decks or flights of roller conveyers which extend from end to end of the drier. As illustrated herein, the drier housing or casing is identified by numeral 10. Within this housing, as indicated in FIGURE 2, there are arranged substantially, uniformly spaced conveyor decks comprised of conveyer rolls 11. It not being essential to the inventions hereof, the drives for the conveyer rolls 11 have not been shown nor has there been shown the usual ducts, fans, and heaters which serve to circulate the heated air through the drier.

In the illustration of the drawing it is assumed that the formed board will pass through the drier face down, and therefore the sprays for spraying the ends of the sheets as they pass through the drier are shown as positioned above the respective conveyer decks and as spraying downwardly. The spray heads are identified by the numeral 13 suitably interposed in or tapped into supply piping 14. The piping 14 and spray heads are shown as extending across the drier, and for reasons which will be apparent, it is preferred that complete individual spray assemblies extend respectively across each line of sheets passing through the conveyer, in those cases where the sheets pass through the drier in multiple lines, that is, where the drier is of such width that the sheets pass through side by side, usually in two separate lines.

The individual spray supply pipes 14 are connected to suitable valves 15, which, preferably, will be impulse-actuated which, when actuated, open for a predetermined and set time and automatically shut off. The specific construction of these valves not being essential to the inventions hereof, such are not described other than by function, as has just been stated. Such valves can be purchased, and as a consequence it is deemed that nothing will be added to this disclosure by an attempt to describe such valves or their specific operation. These valves 15 are, preferably, caused to operate through the intermediary of light sensitive actuating devices which are identified by numerals 18 and 19 connected by suitable wiring 20 and 21 to the respective valves 15, whereby an electrical impulse requisite for initial operation of the valves may be applied thereto from the sensing devices 18 and 19.

Sensing devices of the nature of the devices 18 and 19 hereof are in more or less common use as, for example, they are used in connection with the perforation of postage stamps whereby, through suitable indicia applied to the large sheets of stamps when they are printed, such sheets are suitably positioned for proper perforation through the utilization of sensing devices which are actuated as the pre-printed indicia causes actuation of such sensing devices.

In connection with the inventions hereof, one sensing device, 18, will be positioned adjacent one edge of a line of boards passing through the drier, whereas the other sensing device, 19, will be positioned adjacent the other edge of such line of boards, and for the purpose of respectively spraying the rear edge of a board or sheet passing through the drier and the front edge of the next succeeding board or sheet, the respective spray heads of the two lines of sprays will be directed, generally, one somewhat backward and the other somewhat forward with respect to the forward movement of the sheets passing thereunder.

For actuating the respective sensing devices 18 and 19, suitable indicia, for example a short bar, may be printed or otherwise applied to the endless sheet in which the board is formed, applied, preferably, just before the endless sheet is severed by the knife device which cuts the endless sheet into the lengths in which it passes through the drier. Such indicia is identified on the drawings by numerals 22 and 23, respectively. Indicia 22 is applied just behind the line where the endless board is to be cut, with indicia 23 being applied just ahead of such line, each in the direction of the travel of the board through the drier and thus, as will be evident, indicia 22 causes sensing device 18 to be actuated to result in spraying the forward edge of a sheet length, whereas indicia 23 may actuate sensing device 19 to spray the rear edge thereof.

In those plants where a speed-up section of a conveyer is provided just before or as the board sheets enter the drier, so that they go through the drier either butted end to end or substantially butted, it will be understood that but one sensing device need be used. This single sensing device 18 may operate a single line of spray nozzles 13, or, if required, a single sensing device 18 and valve 15 may control or operate several lines of spray heads more or less closely positioned as may be required to obtain the desired spray pattern for moistening the end portions of the individual sheets as may be required to prevent them from calcining.

In those cases where the board passes through the drier face down, the sprays will, of course, be positioned above the board on the conveyer line, and normally, even though some spray from one conveyer line may pass down through space between the ends of successive boards, such will do no damage as it will fall on the back face of boards on a lower conveyer. However, in those cases where the board passes through the drier face side up, so that the sprays are positioned under the board and spray upwardly, it may be necessary to provide a drip pan 32 under the line of sprays to prevent excess water from an upper set of sprays dripping onto the face sheet of the board on the next lower conveyer line. The drip pan, of course, will extend across the width of the drier and should be suitably inclined so that any excess water falling thereon will drain away. It is to be understood, of course, that the sprays, valves and controls are similarly installed for each conveyer line of the drier, and that such may be installed, suitably spaced, along the length of the drier as may be necessary to sufficiently cool and dampen the board ends to prevent the gypsum core from calcining.

Whereas heretofore the inventions have been described only in connection with the spraying of a mist of water at the end of the boards, there is an alternative. Instead of spraying a mist of water on the ends of the boards, the spraying apparatus, as has been described, may be utilized for spraying what might be termed a "sealing" fluid at the board ends. By spraying at the board end a sealing fluid which will reduce the rate of evaporation from the surface to which it is applied, it is possible to sufficiently slow down the evaporation from the board ends to equal the rate of evaporation from the main body of the core of the board. It is contemplated that if such is desired, the inventions hereof may be so utilized, in which case there would be sprayed on the back surface of the board adjacent its end edges a sealing solution which may be a starch solution, or it might be a suitable casein solution, a resin emulsion, a solution of Guar gum, Karaya gum, or in general substantially any colloidal or substantially colloidal substance which can be suspended or dispersed in water and has at least some adhesive properties. The objective in such case is to provide a coating which will offset or substantially seal off the porosity of the paper cover sheet and thus reduce the overall rate of evaporation from the end portion of the board. Actually, a quick drying lacquer or the like could be used for this purpose, but since the presence of the fumes of many solvents would be undesirable, it is preferred that for this purpose there be used such materials as have been referred to and which are either soluble in or may be readily dispersed in water.

In connection with the foregoing, whether concerning the mere wetting or dampening of the end portions of the board with water, or in connection with the spraying of what might be termed a "sealant" at the ends of the board, it will be understood that since conditions in substantially every drier will vary, as will the drying conditions in drying boards of different thicknesses and the like, the necessary quantity of water or "sealant" to be applied must be determined in each case and the control valves 15 set accordingly so that on each cycle of operation the proper amount of the material is sprayed on the board ends. The proper amount of cooling fluid or "sealant" medium is, of course, that amount which will reduce the drying rate of the end portions of the board sufficiently that the end portions will not be calcined during the drying operation.

As alternative of the sensing elements 18 and 19, it may in some cases be desired to utilize switch like devices for actuating control valves 15. Such switch like devices may be those devices shown in FIGURE 5 of the drawings, or equivalents thereof. As illustrated, the switch like devices comprise pivoted levers 26 mounted on pivots 27 with the pivot point being closer to one end of member 26 than to the other end. The longer and lower end of lever 26 may be curved upwardly somewhat, more or less as illustrated at 28.

At the other end of the lever members 26 there are provided contacts 29 which cooperate with fixed contacts 30. Suitable wiring 31 will connect the contacts 29 and 30 to the valve devices 15. It will be noted that these switch like devices, as described, are gravity operated but it will, of course, be understood that if desired, suitable springs may be associated therewith to bias the long arm portions 26 thereof downwardly. It is believed that the operation of these switch devices will be entirely obvious, but briefly the switch or contact device to the left in the illustration will be rocked counter-clockwise by the front edge of an approaching board. This will close contacts 29 and 30 to establish a circuit to the cyclically operating valve 15 which controls the supply of fluid from the spray heads 13 of a spray line 14 positioned in the drier in a position which is determined by the conditions of operation in the drier, based on the speed of advance of the boards on the conveyers, etc., so that operation of the valve will result in spraying the forward edge of the board which caused actuation of the switch device.

It will be understood, as previously referred to, that valve 15 is a cyclic operating valve which, upon completion of its cycle, will close and stay closed until the next actuating impulse reactivates the valve. As the rear end of the board, the front end of which actuated the switch 26, passes the end of switch 26 its curved end 28 will drop down between that board and the next succeeding board to open contacts 29 and 30. As the front end of the next succeeding board raises, the curved end 28 of the switch contacts 29 and 30 will again be closed to supply the next operating impulse to valve 15.

The other switch member 26, the one to the right of FIGURE 5, closes its contacts 29 and 30 when the forward end 28 drops off the rear end of a board passing the switch. This completes a circuit through contacts 29 and 30 to the other valve 15 to cause such valve to cycle. As the next succeeding board raises the forward end of 28 to this switch it will open contacts 29 and 30 so that when the forward end of the switch drops down between the next succeeding boards, contact will again be re-established to cause recycling of its valve 15. It will be understood that if the drier operates, as was referred to previously, in such manner that the board ends are in substantial contact as they pass through the drier, it may be advisable to provide a small notch, such as 35, in the continuously formed board at the point where it will be cut. Then as the boards pass to the drier switch to the right in FIGURE 5, which preferably will be utilized, it will result that as its forward end 28 drops into notch 35, contacts 29 and 30 will engage to send an operating impulse to its valve 15. In such case, since spray heads can be set to spray the adjacent forward and rear edges of adjacent boards, the single spray line is sufficient.

While it is believed that the invention and operation thereof will be clear to those skilled in the art, such may be briefly summarized as follows:

The principal objective of the invention is that of slowing down the rate of evaporation from the ends of gypsum boards being conveyed through the drier so that these ends will not be calcined due to the more rapid evaporation which occurs at the ends of the board than from those portions of the board inwardly from the ends. The desired results may be achieved either through spraying a cooling fluid on the ends of the boards or by applying a "sealant" which will reduce evaporation so that the ends of the boards do not dry more rapidly than the portions adjacent the ends. The fluids with which the board ends are treated are supplied by a line or lines of spray heads suitably positioned in the drier to supply the coolant or sealant, as the case may be. These spray lines are controlled by cyclically operating valves in connection with which the valve cycle is initiated by an impulse from a suitably positioned light sensing device or mechanical switch devices. Actuating or impulse supplying devices such as those illustrated and described or other more or less similar devices which will supply an actuating impulse to the cyclic valves are suitably located with respect to the board being conveyed, so that forward and rear board edges, respectively, cause actuating impulses to be supplied to the cyclically operating valves. The cyclically operating valves causing the ends of the board to be suitably protected, the objective of preventing calcining of the edge of the boards is accomplished.

The inventions hereof having been described in detail, I claim:

1. In a drier for drying gypsum wallboard comprising an elongated tunnel-like housing through which heated air is circulated and a conveyor mounted and longitudinally disposed within said drier, said conveyor being adapted for moving said sheets of gypsum wallboard in successive adjacency through the length of said drier so that the leading edge of one of said sheets closely follows the trailing edge of another of said sheets, the improvement comprising spray means mounted transversely of the direction of travel of said sheets for applying a fluid coolant across the width of the drier conveyor, valve means controlling the supply of cooling fluid to said spray means, said valve means being such that the supply of cooling fluid flowing therethrough is interrupted after a preset time period following its initial operation, said preset time period being only a minor portion of the time of transversal of any one of said sheets past said spray means, and means connected to said valve means and operatively positioned relative to said sheets of wallboard so that said control means is actuated by each end of each of said sheets to open said valve means to initiate its operating cycle, whereby because of the short operating time of the spray means, only the ends of each gypsum sheet are sprayed with coolant and the major portion of its surface is unsprayed.

2. In a drier for drying gypsum wallboard comprising an elongated tunnel-like housing through which heated air is circulated and a conveyor mounted and longitudinally disposed within said drier, said conveyor being adapted for moving said sheets of gypsum wallboard in successive adjacency through the length of said drier so that the leading edge of one of said sheets closely follows the trailing edge of another of said sheets, the improvement comprising spray means mounted transversely of the direction of travel of said sheets for applying a fluid coolant along a narrow path extending transversely across the width of the drier conveyor, valve means controlling the supply of cooling fluid to said spray means, said valve means being such that the supply of cooling fluid flowing therethrough is interrupted after a preset time period following its operation, said preset time period being only a minor portion of the time of transversal of any one of said sheets past said spray means, and means connected to said valve means and operatively positioned relative to said sheets of wallboard so that said control means is actuated by each end of each of said sheets to open said valve means to initiate its operating cycle, whereby because of the short operating time of the spray means, only the ends of each gypsum sheet are sprayed with coolant and the major portion of its surface is unsprayed.

References Cited in the file of this patent

UNITED STATES PATENTS

| | | |
|---|---|---|
| 1,730,629 | Rule | Oct. 8, 1929 |
| 1,774,398 | Parker | Aug. 26, 1930 |
| 2,136,166 | Darrah | Nov. 8, 1938 |
| 2,185,087 | Jones | Dec. 26, 1939 |
| 2,291,616 | Fletcher | Aug. 4, 1942 |
| 2,324,519 | Krueger et al. | July 20, 1943 |
| 2,365,352 | Moffitt | Dec. 19, 1944 |
| 2,573,355 | Powers et al. | Oct. 30, 1951 |
| 2,747,539 | Peffer | May 29, 1956 |
| 2,811,130 | Friderici | Oct. 29, 1957 |